US012789656B2

(12) United States Patent
Garcia-Ferre et al.

(10) Patent No.: US 12,789,656 B2
(45) Date of Patent: Nov. 10, 2026

(54) EV CHARGING CONNECTOR WITH PASSIVE COOLING AND TEMPERATURE SENSOR

(71) Applicant: ABB E-mobility B.V., Delft (NL)

(72) Inventors: Francisco Garcia-Ferre, Baden (CH); Ali Ugur, The Hague (NL)

(73) Assignee: ABB E-Mobility B.V., Delft (NL)

( * ) Notice: Subject to any disclaimer, the term of this patent is extended or adjusted under 35 U.S.C. 154(b) by 944 days.

(21) Appl. No.: 17/949,285

(22) Filed: Sep. 21, 2022

(65) Prior Publication Data

US 2023/0096869 A1 Mar. 30, 2023

(30) Foreign Application Priority Data

Sep. 21, 2021 (EP) .................................... 21197989

(51) Int. Cl.
*B60L 53/302* (2019.01)
*B60L 53/16* (2019.01)
*H01R 13/533* (2006.01)
*H01R 13/66* (2006.01)

(52) U.S. Cl.
CPC ............. *B60L 53/302* (2019.02); *B60L 53/16* (2019.02); *H01R 13/533* (2013.01); *H01R 13/6683* (2013.01)

(58) Field of Classification Search
CPC ..... B60L 53/302; B60L 53/16; H01R 13/533; H01R 13/6683
USPC .......................................................... 320/109
See application file for complete search history.

(56) References Cited

U.S. PATENT DOCUMENTS 11,390,178 B1 * 7/2022 Wiegman ................ B60L 53/16
11,613,185 B1 * 3/2023 Wiegman .............. H02J 7/0045 320/109
11,718,192 B2 * 8/2023 Führer ................... H01R 24/30 320/109
2008/0128118 A1 * 6/2008 Chen ................... H01L 23/4006 165/104.33
2014/0009121 A1 * 1/2014 Saint-Marcoux ....... B60L 58/15 320/137

(Continued)

FOREIGN PATENT DOCUMENTS

DE 102017222808 A1 * 6/2019 .............. B60L 53/16
DE 102020102219 A1 * 8/2021 ........... H05K 1/0206

(Continued)

OTHER PUBLICATIONS

European Patent Office, Extended European Search Report in European Patent Application No. 21197989.3, 10 pp. (Feb. 23, 2022).

*Primary Examiner* — Suresh Memula
(74) *Attorney, Agent, or Firm* — McCarter & English, LLP; Michael M. Gnibus

(57) ABSTRACT

An electric vehicle (EV) charging connector includes a contact element and a passive cooling device attached to the contact element at a connection point. The contact element and the passive cooling device form a thermal conductive arrangement. The charging connector further comprises at least one temperature sensor attached to the thermal conductive arrangement, wherein the at least one temperature sensor is configured to provide temperature data for detecting a thermal conductivity fault of the thermal conductive arrangement.

13 Claims, 3 Drawing Sheets

(56) References Cited

U.S. PATENT DOCUMENTS

| | | | | |
|---|---|---|---|---|
| 2016/0138980 | A1* | 5/2016 | Jefferies | G01K 7/24<br>374/141 |
| 2019/0109409 | A1 | 4/2019 | Fuehrer et al. | |
| 2019/0322186 | A1* | 10/2019 | Arai | B60L 53/18 |
| 2020/0067237 | A1 | 2/2020 | Sarraf et al. | |
| 2020/0083701 | A1 | 3/2020 | Myer et al. | |
| 2020/0094689 | A1 | 3/2020 | Myer et al. | |
| 2020/0290468 | A1* | 9/2020 | Moseke | H01R 13/6683 |
| 2023/0091452 | A1* | 3/2023 | Garcia-Ferre | B60L 53/18<br>320/109 |
| 2023/0208148 | A1* | 6/2023 | Wiegman | H02J 7/0042<br>320/109 |

FOREIGN PATENT DOCUMENTS

| | | | | | |
|---|---|---|---|---|---|
| DE | 102022129995 | A1 | * | 5/2024 | B60L 53/16 |
| EP | 3556597 | A1 | * | 10/2019 | H02J 7/0036 |
| EP | 3770005 | A1 | | 1/2021 | |
| EP | 4000991 | A1 | * | 5/2022 | H05K 7/20318 |
| EP | 4151448 | A1 | * | 3/2023 | H01R 13/6683 |
| EP | 4151450 | A1 | * | 3/2023 | B60L 53/66 |

* cited by examiner

EV CHARGING CONNECTOR WITH PASSIVE COOLING AND TEMPERATURE SENSOR

CROSS-REFERENCE TO RELATED APPLICATIONS

This patent application claims priority to European Patent Application No. 21197989.3, filed on Sep. 21, 2021, which is incorporated herein in its entirety by reference.

FIELD OF THE DISCLOSURE

The present disclosure relates to an EV (Electric Vehicle) charging connector, an EV charging connector system, a method, and a use of temperature sensors.

BACKGROUND OF THE INVENTION

Current EV charging connectors suffer from deficiencies such as ingress of water into the connectors, mechanical damage of plastic parts and over-heating. The over-heating may be caused by a damage leading to a broken thermal conductivity of parts that are integrated for conducting the heat away from the heat source, usually a contact element carrying the charging current at the interface to the car inlet.

BRIEF SUMMARY OF THE INVENTION

There may be a desire to improve an EV charging connector with respect to heat.

The described embodiments of the present disclosure pertain to the EV charging connector, an EV charging connector system, a method, and a use of temperature sensors. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, an EV charging connector comprising a contact element, a passive cooling device, and at least one temperature sensor is provided. The passive cooling device is attached to the contact element at a connection point. The contact element and the passive cooling device form a thermal conductive arrangement. The at least one temperature sensor is attached to the thermal conductive arrangement and is configured to provide temperature data for detecting a thermal conductivity fault of the thermal conductive arrangement.

The contact element may comprise a compartment for one or more contacts that connect the cable carrying the charge current from the charging station with the corresponding contact of the car inlet. The contact element may be galvanically connected to the contacts or insulated. The passive cooling device may be connected to a contact or the contact element or both. The embodiments may apply to the contact element as well as to the contacts. Therefore, in the following, it is not distinguished between the contact element and the contacts. The contact element may be made of metal. It represents the heat source of the connector. The passive cooling device is attached to this contact element for receiving the heat. The passive cooling element may e.g. be a solid or hollow metallic or ceramic heat conductor. Since the contact element, which conducts the heat from where it is generated to the cooling element, is also a heat conductor, the contact element together with the cooling element is referred to as a heat conduction arrangement.in this disclosure. The EV connector may comprise more than one passive cooling devices.

Temperature sensors may be attached to the thermal conductive arrangement at one or several different positions or parts of the thermal conductive arrangement in order to detect a thermal fault. As thermal fault may be considered that the heat is not conducted from the heat source to the cooling portion or parts of the cooling portion of the passive cooling device as intended. The reason for a fault may be, for example, a damage such as a broken mechanical connection. By measuring the temperature at one or more locations, the fault can be detected as described in the following.

BRIEF DESCRIPTION OF THE SEVERAL VIEWS OF THE DRAWING(S)

DETAILED DESCRIPTION OF THE INVENTION

Corresponding parts are provided with the same reference symbols in all figures.

Figure 1:
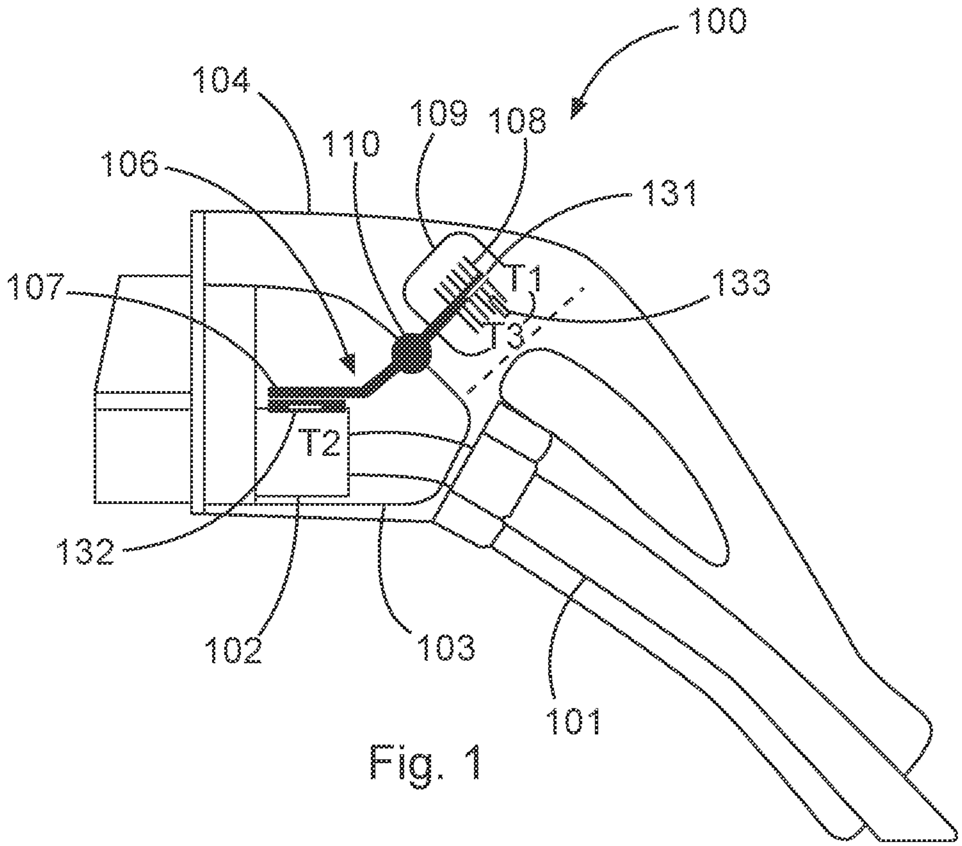
FIG. 1 is a diagram of a first example of an EV connector in accordance with the disclosure.

FIG. 1 shows a diagram of a first example of an EV connector 100 that operates at high current ratings (i.e. >300 A). Such ratings are enabled by proper dimensioning of the charging cable 101 and by a passive cooling system such as heat pipe 106. The EV charging connector 100 comprises an external housing 104, an inner housing 103, a contact element 102, a passive cooling device 106, and at least one temperature sensor 131 . . . 133. The external housing 104 represents the handle for a user and comprises a first compartment 121. The inner housing 103 is arranged inside the first compartment and comprises a second compartment. The contact element 102 is arranged inside the second compartment. The passive cooling device 106 is attached to the contact element 102 at a connection point. The passive cooling device 106 runs from the contact element 102 through the second compartment and via a sealed opening 110 to the first compartment, such that a condenser portion 109 of the passive cooling device 106 is located in the first compartment. The contact element 102, the passive cooling device 106, and the fin arrangement 108 form a thermal conductive arrangement.

The temperature sensors 131, 132, and 133 are attached to the contact element 102, the condenser portion 109 of the heat pipe 106, and a fin of fin arrangement 108. Preferably, two, three or more temperature sensors in positions T1, T2, T3 are used to identify mechanical damage. The heat pipes behave as thermal highway for the heat to be transferred from the location where the heat is generated, i.e. contacts or contact elements 102, towards the condenser fins 108, and from there towards the environment.

Since heat pipes basically provide a highway for heat transfer, the temperature at both ends of a heat pipe is typically very close, with a very low thermal gradient. In other words, T1 131 and T2 132 are typically very close. The difference may be, for example, smaller than 3-10° C. The temperature gradient along the heat pipe 106 is very small compared to the thermal gradient in the radial direction, i.e., the direction from the center to the outer area of the fins. Thus, if the temperature is measured by sensor 132 (T2) at the contact element 102 and by sensor 131 (T1) at the other end of the heat pipe 106, the difference must be low, typically in the range of few degrees Kelvin. A low difference indicates a good thermal contact.

If the gradient in temperature is high and the measurements of temperature between contact or contact element 102 and opposite side of the heat pipe 106 are very different, then it will be possible to determine that there is a loss of mechanical integrity at the connection point.

Similarly, when attaching a temperature sensor 133 (T3) on the fins, the thermal gradient between heat pipe 106 and fins 108 has to be high, because the heat transfer within the fins is worse due to the thin geometry. Therefore, the tip of the fins 108 is close to the ambient temperature, whereas the tip of the heat pipe 106 is close to the temperature of the contact element 106.

The temperatures or especially the temperature differences may be compared to pre-defined thresholds. The definition of the thresholds may be obtained by a calibration, such that an allowed range of values of temperatures or temperature differences is obtained.

Therefore, an arrangement and a method to determine the health of a connector that utilizes passive cooling devices such as heat pipes to evacuate heat is presented. The determination of the health is achieved by using one, or preferably more than one temperature sensors: one sensor (T2) 132 on the contact elements 102 and one sensor (T1) 131 on the opposite side of the passive cooling device 106 or a sensor (T3) 133 on the fins 108.

Figure 2:
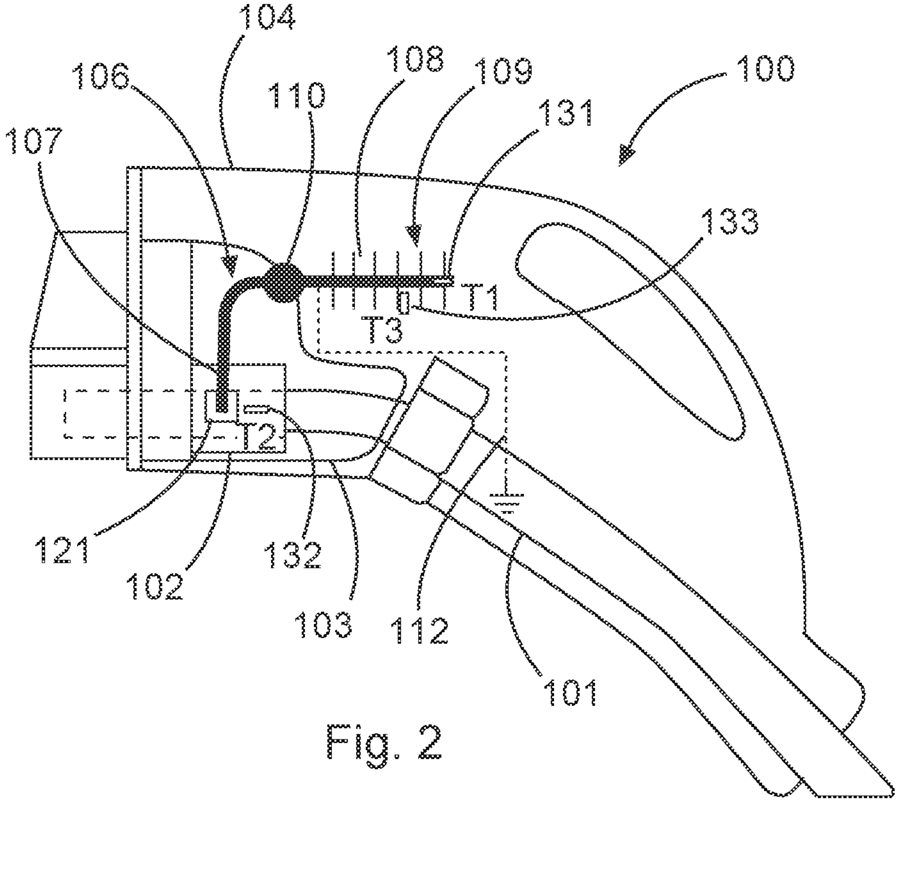
FIG. 2 is a diagram of a second example of an EV connector in accordance with the disclosure.

FIG. 2 shows a diagram of a second example of an EV connector 100, with same elements as in FIG. 1, however with a different design. Additionally, the electrical grounding 112 of the heat pipe 106 and a ceramic sleeve 111 is shown. The ceramic sleeve 111 may be used in order to ensure thermal transfer and to guarantee electrical insulation at the same time. The ceramic sleeve 111 can be glued on the tip of the heat pipe 106, and the assembly can be glued onto the contact element 102. The ceramic sleeve material should be selected properly. Material such as AlN or Al2O3 may provide good electrical insulation and good thermal conduction.

Figure 3:
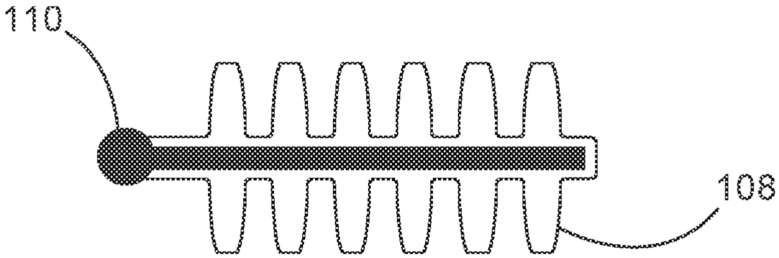
FIG. 3 is a detailed diagram of a fin arrangement in accordance with the disclosure.

FIG. 3 shows a detailed diagram of a fin arrangement 108. The connection between the heat pipe 106 and the condenser fins 108 is important to guarantee proper heat exchange. A damage or disconnection would lead to malfunctioning of the system. The connection can be made, for example, through direct brazing of the fins onto the heat pipe 106, or by machining the fins 108 out of a block, creating a sleeve that slides onto the heat pipe 106. The fins 108 of the condenser may be manufactured as a sleeve glued, brazed or welded onto the heat pipe 106. The thermal gradient along the fins 108 may be steep if they are made of plastic material with high thermal conductivity, and may be lower if they are made of Al or Cu, however, still higher than within the heat pipe 106.

Figure 4:
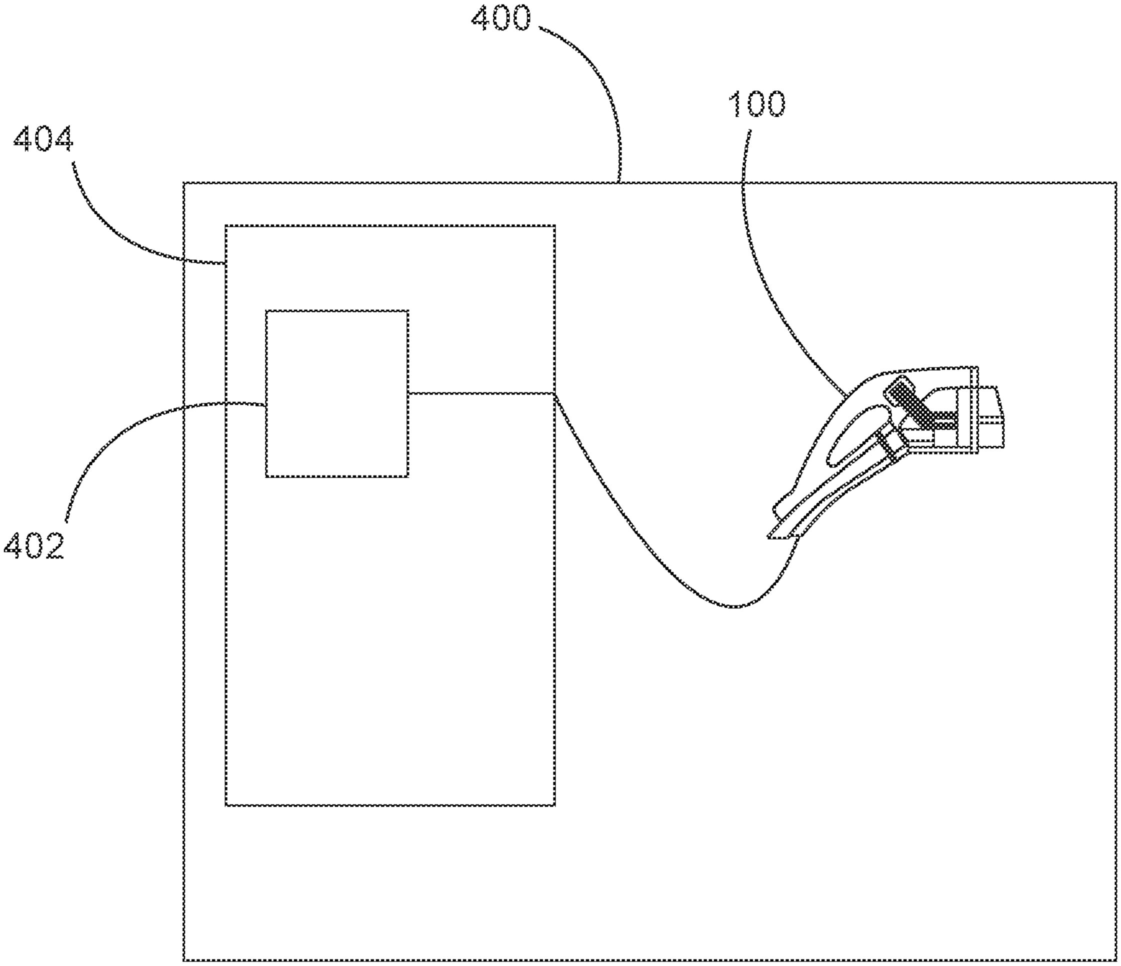
FIG. 4 is an EV charging connector system in accordance with the disclosure.

FIG. 4 shows an EV charging connector system 400. System 400 comprises the charging connector 100 and the charging station 404 with control unit 402, which is the control unit that, in this example, detects the fault by evaluating the temperature data received from the temperature sensors in the connector 100.

Figure 5:
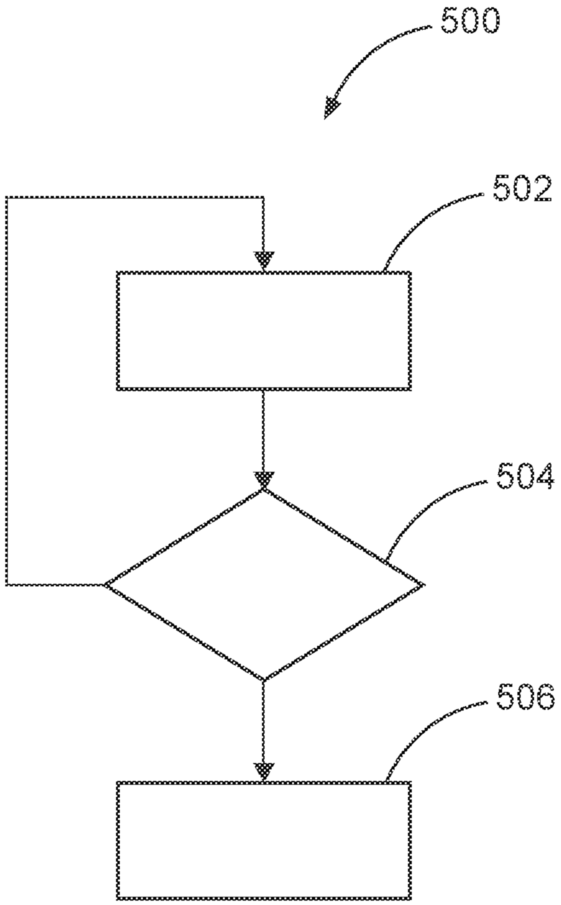
FIG. 5 is a flowchart for a method for detecting thermal conductivity faults in an EV charging connector.

FIG. 5 shows a flow diagram of a method 500 for detecting thermal conductivity faults in an EV charging connector 100. In step 502, temperature data for detecting a thermal conductivity fault of the thermal conductive arrangement is provided. In step 504, it is determined if a thermal conductivity fault is present. The determination is made by comparing temperature differences of temperatures measured by different sensors with a threshold. If the temperature difference is within an allowed range, no fault is determined and the next measurement is performed. If the temperature difference exceeds an allowed range, a fault is determined. Then, in step 506, one or more of the following actions are performed:

(i) The charging session is stopped.
(ii) The next charging session will not be started.
(iii) A lower maximum current will be applied, for example, 300 A, which the connector will be able to handle without the need for evacuating heat through the heat pipes.
(iv) A need to substitute the connector is indicated.

Other variations to the disclosed embodiments can be understood and effected by those skilled in the art in practicing the claimed invention, from the study of the drawings, the disclosure, and the appended claims. In the claims the word "comprising" does not exclude other elements or steps and the indefinite article "a" or "an" does not exclude a plurality. A single processor or other unit may fulfill the functions of several items or steps recited in the claims. The mere fact that certain measures are recited in mutually different dependent claims does not indicate that a combination of these measures cannot be used to advantage. Any reference signs in the claims should not be construed as limiting the scope of the claims.

REFERENCE NUMERALS

100 EV charging connector
101 charging cable
102 contact element
103 inner housing
104 external housing
106 passive cooling device/heat pipe
107 evaporator portion
108 fin arrangement
109 condenser portion
110 sealed opening
111 ceramic sleeve
112 electrical grounding
121 connection point/first compartment
131 temperature sensor T1
132 temperature sensor T2
133 temperature sensor T3
400 EV charging connector system
402 control unit
404 charging station
500 method for detecting thermal conductivity faults in an EV charging connector
502 method step

504 method step

506 method step

The presented connector improves the quality and safety of usual connectors, especially for connectors that are designed to operate at high current ratings above, e.g., 300 A.

According to an embodiment, the passive cooling device is a heat pipe comprising a fin arrangement attached to the heat pipe.

A heat pipe is a very effective heat conductor. The pipe is filled partly with a coolant, for example a liquid or water, which is evaporated in the portion near the heat source, i.e., the contact or contact element. The evaporated coolant transfers the heat towards the heat dissipation portion of the heat pipe, where the coolant is condensed. The coolant then flows back to the evaporator portion through gravity forces or through a capillary structure inside the pipe, such as a wick or a porous structure. An effective heat dissipation can be achieved by attaching fins to the pipe. Alternatively or additionally, an active cooling device such as a cooling line through which a coolant is pumped or a fan may be used. The fins are considered part of the heat pipe. One or more temperature sensors may be attached to the fins.

According to an embodiment, the connector is configured to provide less or no charging current, if a thermal conductivity fault of the thermal conductive arrangement is detected, wherein the a thermal conductivity fault is determined when a temperature provided by one of the temperature sensors exceeds an allowed range. Alternatively or additionally, a fault in case that at least two temperature sensors are attached to the thermal conductive arrangement is determined when a temperature difference between temperature sensors exceeds an allowed range. Hereby, the range is defined by a pre-defined threshold.

For example, if the heat source gets too hot, such that a threshold is exceeded, or the cooling device gets not hot enough, such that a threshold is not reached, a fault may be determined. The range in the first case may be “higher than threshold”, and in the second case “lower than threshold”. The threshold may be a single, fixed pre-defined value, or it may be a value of a pre-defined curve. The curve may be a function of time, amount of charging current, environment temperature, and/or history. The history may comprise a previous session, or the time span between the previous and the current charging sessions.

In case of two or more sensors, differences of the temperature at different locations can be determined and compared to a threshold. In this way, it can be determined whether the thermal conductivity or the heat dissipation is intact.

The thresholds may be determined by a calibration, i.e. determined under defined conditions. The threshold may depend on materials used for the heat pipe and on form factors of the heat conducting elements, on the connector type, environmental conditions, etc.

According to an embodiment, a first temperature sensor of the at least one temperature sensors is attached to the heat pipe.

Since the temperature of the heat pipe is nearly equal along the pipe, the sensor may be attached anywhere at or on the pipe. This temperature sensor may deliver data for a comparison to a threshold, or it may be a basic sensor providing the temperature to which the data of other sensors is compared, i.e. for calculating the temperature difference to sensors at other locations.

According to an embodiment, a second temperature sensor of the at least one temperature sensors is attached to the contact element and/or a third temperature sensor of the at least one temperature sensors is attached to the fin arrangement.

The second temperature sensor thus provides the temperature to detect a fault of the connection of the heat pipe to the contact element, and the third temperature sensor to detect a fault of the connection of the fins with the pipe. Of course, the information may be combined and additional sensors may be applied. For example, temperature sensors may be attached to every fin or every second fin, or at other positions where a damage may occur.

According to an embodiment, the EV charging connector further comprises an external housing and an inner housing. The external housing represents the handle for a user and comprises a first compartment. The inner housing is arranged inside the first compartment and comprises a second compartment. The inner housing is configured to seal the second compartment from the first compartment. The passive cooling device runs from the contact element through the second compartment and via a sealed opening to the first compartment, such that a condenser portion of the passive cooling device is located in the first compartment. The contact element is arranged inside a second compartment.

The connector thus may have two housings, which are an external and an inner housing. The external housing forms the handle for the user. It encloses a first compartment, which forms a hollow with a free space filled with air. In the first compartment, a portion of the passive cooling device is located. This portion is the heat-dissipating portion that dissipates the heat to the air. The external housing is not tight such that the heated air can leak to the environment and fresh air can enter the first compartment such that a cooling is achieved. The external housing further encloses the inner housing. The inner housing is tight such that no air and no water can enter. The inner housing encloses a second compartment with a free space. In the second compartment, the contact element is arranged that connects the cable carrying the charge current from the charging station with the corresponding contact element of the car inlet. The passive cooling device runs from the contact element through the free space of the inner compartment and passes the inner housing through a sealed opening in the inner housing, and finally ends in the first compartment. In this way, the heat is conducted from the contact element to the first compartment where it is dissipated and can escape to the environment.

By the invention, a broken connection of the heat pipe to the contact element in the tight and sealed second compartment can be detected, without opening and possibly destroying the inner housing, e.g., when one temperature sensor is connected to the contact element and one connector is connected to the heat pipe in the first compartment.

According to a second aspect, an EV charging connector system comprising an EV charging connector as described herein and a control unit is provided. The control unit is configured to detect whether the temperature data are within an allowed range, wherein the range is defined by a predefined threshold.

That is, the system consisting of charging station and connector, has a control unit that is preferably located in the charging station. The control unit receives the temperature data from the temperature sensors, e.g. by a wire that is running parallel to the charging cable from the connector to the station, or wirelessly. Alternatively, the control unit is split in a detection part and a control part, where the detection part evaluates the temperature data and provides a control signal to the station. The control part then controls the charging current accordingly. Any other splitting may be possible. The detection part may be located in the connector, and the control part may be located in the charging station.

According to an embodiment, the control unit is further configured to stop the charging session if the temperature data are not within an allowed range.

In other words, the charging current is set to zero, at least as long as the temperature or the temperature difference exceeds the allowed range. A hysteresis may be applied according to which the charging may be resumed.

According to an embodiment, the control unit is further configured not to start a next charging session if the temperature data are not within an allowed range.

The detected fault may be such severe, that a further charging session would not be secure. The decision may be based, for example, on the time since starting the charging. The faster the fault is detected, i.e., occurred, the more severe may be the fault. A further criterion might be which of the temperature sensors or combination of temperature sensors have signaled the data that led to the detection of the fault.

According to an embodiment, the control unit is further configured to apply a lower maximum current.

That is, the control unit limits or reduces the charging current. The limitation might be a general rule or might depend on the amount and/or gradient of the temperature or temperature difference.

According to an embodiment, the control unit is further configured to indicate that the connector has to be substituted.

The fault may be indicated locally at the connector, at the station, or may be transmitted over a wired or wireless connection to, for example, a server or a further communication receiver. The indication may be more detailed. For example, it may indicate a fault severity. The indication may be in form of an acoustic or optical signal, or an output on a display.

According to an embodiment, the EV charging connector system comprises an EV charging station, and the control unit is located in the charging station.

According to a further aspect, an EV charging station is provided comprising a control unit for an EV charging connector system as described herein.

According to a further aspect, a method for detecting thermal conductivity faults in an EV charging connector is provided. The method comprises the step providing temperature data for detecting a thermal conductivity fault of a thermal conductive arrangement as described herein. The temperature data is provided by sensors attached to the conductive arrangement. The method may further comprise the steps of calculating temperature differences and acting upon a fault detection, wherein a fault detection is performed by comparing the temperatures or temperature differences to a threshold as described above and in the description of the figures. The acting may comprise one or more of the following steps: reducing the charging current, stopping the charging session and/or indicating the fault or indicating that the connector has to be substituted.

According to a further aspect, a use of a temperature sensor for detecting a thermal conductivity fault of a thermal conductive arrangement is provided. Several temperature sensors may be used to calculate temperature differences.

These and other features, aspects and advantages of the present invention will become better understood with reference to the accompanying figures and the following description.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A charging connector for an electric vehicle (EV), comprising:

a contact element;

a passive cooling device attached to the contact element at a connection point, wherein the passive cooling device is a heat pipe with an evaporator portion and a condenser portion;

wherein the contact element and the heat pipe form a thermal conductive arrangement;

a first temperature sensor attached to the heat pipe;

a second temperature sensor attached to the contact element; and a control unit associated with the first temperature sensor and the second temperature sensor, wherein the control unit is configured to detect a thermal conductivity fault of the thermal conductive arrangement by determining whether a temperature difference between a temperature measured by the first temperature sensor and a temperature measured by the second temperature sensor exceeds a pre-defined threshold.

2. The charging connector according to claim 1, wherein the charging connector further comprises a fin arrangement attached to the condenser portion of the heat pipe.

3. The charging connector according to claim 1,
- wherein the connector is configured to reduce the charging current or provide no charging current when a thermal conductivity fault of the thermal conductive arrangement is detected by the control unit.

4. The charging connector according to claim 2, further comprising a third temperature sensor attached to the fin arrangement.

5. The charging connector according to claim 1, further comprising:
- an external housing; and
- an inner housing;
- wherein the external housing represents a handle for a user and comprises a first compartment;
- wherein the inner housing is arranged inside the first compartment and comprises a second compartment;
- wherein the inner housing is configured to seal the second compartment from the first compartment; and
- wherein the passive cooling device extends through the second compartment and via a sealed opening to the first compartment, such that a condenser portion of the passive cooling device is located in the first compartment.

6. An electric vehicle (EV) charging connector system, comprising:
- a control unit;
- a charging connector, the charging connector comprising:
- a contact element;
- a passive cooling device attached to the contact element at a connection point, wherein the passive cooling device is a heat pipe with an evaporator portion and a condenser portion;
- wherein the contact element and the heat pipe form a thermal conductive arrangement;
- a first temperature sensor attached to the heat pipe; and
- a second temperature sensor attached to the contact element;
- wherein the control unit is associated with the first temperature sensor and the second temperature sensor, wherein the control unit is configured to detect a thermal conductivity fault of the thermal conductive arrangement by determining whether a temperature difference between a temperature measured by the first temperature sensor and a temperature measured by the second temperature sensor exceeds a pre-defined threshold.

7. The EV charging connector system according to claim 6, wherein the control unit is further configured to stop a charging session when the control unit detects a thermal conductivity fault.

8. The EV charging connector system according to claim 6, wherein the control unit is configured not to start a next charging session when the control unit detects a thermal conductivity fault.

9. The EV charging connector system according to claim 6, wherein the control unit is configured to apply a lower maximum current based on the temperature data.

10. The EV charging connector system according to claim 6, wherein the control unit is further configured to indicate that the EV charging connector has to be substituted.

11. The EV charging connector system according to claim 6, further comprising an EV charging station connected to the charging connector by electrical conductors, wherein the control unit is located in the EV charging station.

12. A method for detecting thermal conductivity faults in an electric vehicle (EV) charging connector, comprising:
- providing a control unit;
- providing a charging connector, the charging connector comprising:
- a contact element;
- a passive cooling device attached to the contact element at a connection point, wherein the passive cooling device is a heat pipe with an evaporator portion and a condenser portion;
- wherein the contact element and the heat pipe form a thermal conductive arrangement;
- a first temperature sensor attached to the heat pipe;
- a second temperature sensor attached to the contact element; and
- a control unit associated with the first temperature sensor and the second temperature sensor, wherein the control unit is configured to detect a thermal conductivity fault of the thermal conductive arrangement by determining whether a temperature difference between a temperature measured by the first temperature sensor and a temperature measured by the second temperature sensor exceeds a pre-defined threshold;
- providing from the first temperature sensor and the second temperature sensor temperature data to the control unit;
- using the control unit to detect a thermal conductivity fault of the thermal conductive arrangement; and
- detecting whether the temperature data is within an allowed range, the allowed range being defined by the pre-defined threshold.

13. The method of claim 12, wherein the charging connector further comprises a fin arrangement attached to the condenser portion of the heat pipe, and wherein detecting the thermal conductivity fault further includes detecting a temperature of the fin arrangement using a third temperature sensor.

* * * * *